UNITED STATES PATENT OFFICE.

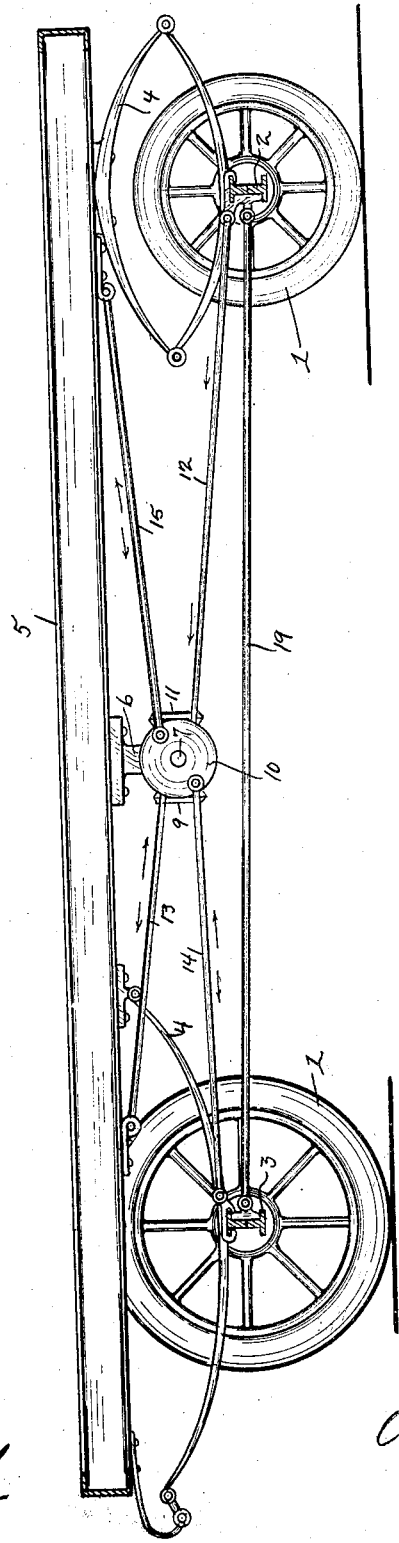

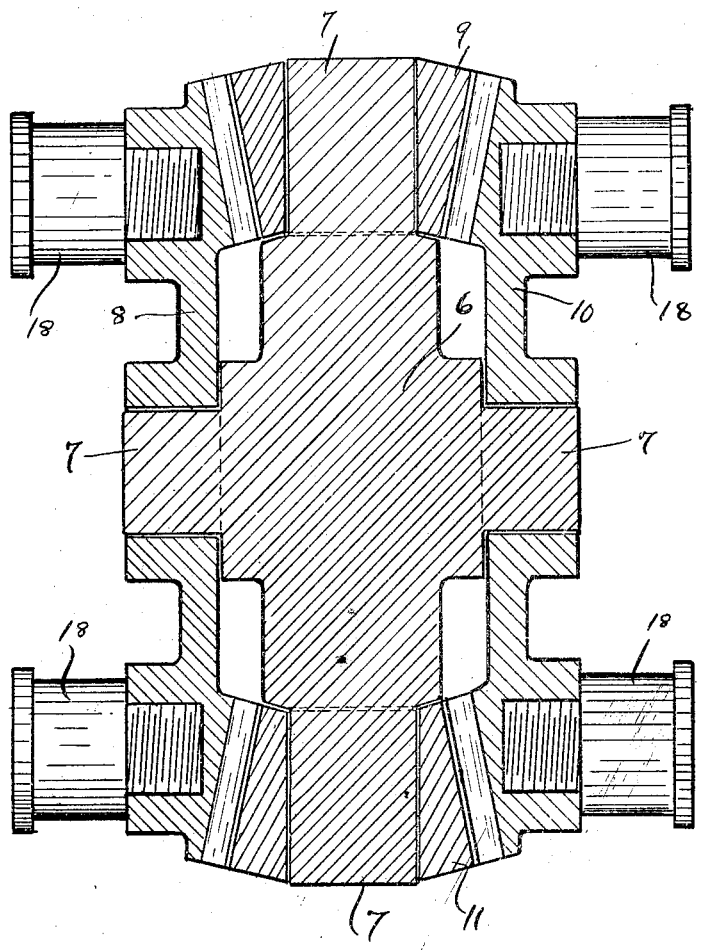

JAMES WORTHINGTON, OF MANITOWOC, WISCONSIN.

STRAIN-DISTRIBUTING DEVICE FOR VEHICLES.

No. 879,349.     Specification of Letters Patent.     Patented Feb. 18, 1908.

Application filed April 24, 1907. Serial No. 369,924.

*To all whom it may concern:*

Be it known that I, JAMES WORTHINGTON, a citizen of the United States, residing at Manitowoc, county of Manitowoc, and State of Wisconsin, have invented new and useful Improvements in Strain - Distributing Devices for Vehicles, of which the following is a specification.

My invention relates to improvements in strain distributers for automobiles.

The object of my invention is to provide a form of construction in which the shocks and jolts caused by obstructions will be transmitted through a central distributing point to the platform, in a manner to relieve the strains of load inertia upon the springs, and also to provide a structure in which the twisting strains due to inequalities of the roadway will be avoided.

In the following description reference is had to the accompanying drawings in which Figure 1 is a side view of a vehicle embodying my invention. The driving connections being omitted. Fig. 2 is a horizontal sectional view of the central connecting member showing the gear supporting block in cross section.

Like parts are identified by the same reference characters in both views.

1 are the vehicle wheels, 2 and 3 the axle bars, 4 the springs, and 5 the spring supported platform, all of which may be of any ordinary construction. The platform is provided with a centrally disposed depending block 6 having outwardly projecting trunnions 7, upon which are mounted a set of mutually intermeshing bevel gear wheels 8, 9, 10, and 11. A strut rod 12 extends from one of the side gear wheels below the axis to the axle bars 2 and another strut rod 13 extends from above the axis in the opposite direction to the platform 5. The other side gear wheel 10 is connected by a strut rod 14, below its axis, with the other axle bar 3, and by a strut rod 15, above its axis, with the platform 5. The strut rods 13 and 15 are preferably connected with the platform above the axle bars 2 and 3, respectively, or near the springs. The strut rods are preferably connected with the gear wheels by crank pins 18. With this construction, it is obvious that a sudden shock to a wheel is transmitted through the strut rod to the gearing and distributed, the gear being free to rotate and the intermediate gears 9 and 11 transmitting motion from either side gear wheel to the other. In a similar manner the strains of load inertia, instead of being exerted upon the springs, will be transmitted through the strut rods to the axle bars. The vertical movement of the springs at one end of the vehicle is also transmitted and distributed to the springs at the other end whereby each spring co-operates with the others. A push upon one rod is distributed and exerted as a pull upon the other three, and a pull on one is distributed as a push in three of the rods. The front and rear axles are also connected by the reach rod 19, but all of the movements are permissible by reason of the vertical movement in the springs. The normal positions of the crank pins 18 are preferably on radial lines extending at an angle of about 45° from a vertical line through the axis of the gear wheel.

Having thus described my invention, what I claim as new and desire to secure by Letters Patent is,

1. In a vehicle, the combination of the axle bars and a spring supported platform, of a set of intermeshing gear wheels connected with the central portion of the platform, and strut rods each pivotally connected with one of the gears at a point vertically offset from the axis of gear rotation, said gears being arranged to distribute strains from any one of the strut rods to each of the others, some of said strut rods being connected with the platform.

2. In a vehicle, the combination of the axle bars and a spring supported platform, of a set of intermeshing gear wheels connected with the central portion of the platform, and strut rods connected with some of the gears, said gears being arranged to distribute strains on any one of the strut rods to each of the others,—some of said strut rods being connected with the axle bars and others with the spring supported platform.

3. In a vehicle, the combination with axle bars and a spring supported platform, of a set of intermeshing gear wheels connected with the central portion of the platform, strut rods connecting two opposing gear wheels with the respective axle bars, and other strut rods connecting each of such gear wheels in the opposite direction with the platform, all of the strut rods having crank pin connection with the gear wheels, and those leading to the axle bars being connected with the gear wheels on the opposite side of the horizontal axial plane from those leading to the platform.

4. In a vehicle, the combination with axle bars and a spring supported platform, of a set of intermeshing gear wheels connected with the central portion of the platform, strut rods connecting two of opposing gear wheels with the respective axle bars, and other strut rods connecting each of such gear wheels in the opposite direction with the platform, all of the strut rods having crank pin connection with the gear wheels, and those leading to the axle bars being connected with the gear wheels on the opposite side of the horizontal axial plane from those leading to the platform and in radial lines normally extending at an angle to such plane.

5. In a vehicle, the combination with axle bars and a spring supported platform, of a set of strut rods leading from the axle bars and the end portions of the platform inwardly and convergingly toward a central space underneath the platform, and motion transmitting gearing, supported by the platform, for distributing the energy exerted through one of the rods to all the others.

6. In a vehicle, the combination with axle bars and a spring supported platform, of a set of strut rods leading from the axle bars and the end portions of the platform inwardly and convergingly toward a central space underneath the platform, and motion transmitting gearing, supported by the platform, for distributing the energy exerted through one of the rods to all the others in an opposite direction relatively to said mechanism.

In testimony whereof I affix my signature in the presence of two witnesses.

JAMES WORTHINGTON.

Witnesses:
R. S. NASH,
PEARL SMART.